United States Patent Office 2,898,197
Patented Aug. 4, 1959

2,898,197

METHOD OF TREATING PYRRHOTITIC MINERAL SULPHIDES CONTAINING NON-FERROUS METAL VALUES

Frank A. Forward and Anna M. Armstrong, Vancouver, British Columbia, Canada, assignors to Sherritt Gordon Mines Limited, Toronto, Ontario, Canada No Drawing. Application November 5, 1958
Serial No. 771,955

6 Claims. (Cl. 23—224)

This invention relates to a method of treating pyrrhotitic mineral sulphides which contains non-ferrous metal sulphides for the production of a solution which contains dissolved non-ferrous metal values, a sulphur product comprised of elemental sulphur and non-ferrous mineral sulphides, and an iron oxide residue which is substantially free from non-ferrous metal values.

This application is a continuation-in-part of application Serial No. 387,781, filed October 22, 1953.

Processes for concentrating selected mineral values contained in mineral sulphide ores and for separating such selected mineral values from other minerals with which they are associated in an ore are well known and are widely used in the mining industry. The flotation process is probably the most widely used method of wet concentration of ores for separating valuable constituents from gangue material and for selectively concentrating a mineral or a group of minerals as a small fraction of a larger body of starting material which contains values of other economically recoverable minerals.

There are, however, ores which are not easily or directly amenable to conventional flotation processes. Also, in the operation of a selective flotation process there usually is produced a middling product which contains small percentages of desired minerals and from which metal values can be recovered only with great diffculty and at high cost. For example, in the selective flotation of lead-zinc ores a middling product is formed which contains values of both metals. Also, in the selective flotation of nickel-copper ores a middling product is obtained which contains values of both nickel and copper. Such middling products contain relatively small amounts of metal values but represent a serious loss of metal values if discarded and high capital and operating costs if treated for the recovery of the metal values.

A method has been proposed in which elemental sulphur can be produced from pyrrhotitic mineral sulphide ores and concentrates by reacting such ores and concentrates in an aqueous medium at a temperature within the range of from about 100° F. to about 290° F. with an oxygen-bearing, oxidizing gas under an oxygen partial pressure of from about 25 to about 100 pounds per square inch above the pressure autogenously generated at the temperature at which the reaction is conducted. Under these conditions, sulphide sulphur contained in the pyrrhotitic material is rapidly oxidized to elemental sulphur which can be agglomerated in the reaction zone to form pellets which can be separated from the undissolved residue, such as by screening.

It has been found that this method of producing elemental sulphur is ideally adapted for treating pyrrhotitic material which contains non-ferrous metal values for the production of elemental sulphur and for the extraction and separation therefrom of non-ferrous metal values. The present method is also ideally adapted for the treatment of mineral sulphides which normally are not amenable to concentration by flotation to prepare them in a form in which they are amenable to flotation.

The term pyrrhotitic mineral sulphides employed herein is intended to mean that the sulphur content of the material is combined in a form similar to that in which it is combined in pyrrhotite, an iron sulphide having the general formula $Fe_xS_{x+1}$ wherein "$x$" is a number greater than 1, for example, $Fe_7S_8$ to $Fe_{11}S_{12}$. The pyrrhotitic mineral sulphide materials to which this invention is applicable, therefore, can be represented broadly by the formula $Me_xS_{x+1}$ wherein "Me" represents a metal. Pyritic material, such as pyrite, $FeS_2$, can be converted into pyrrhotitic material by heating in an atmosphere free of oxygen or containing less than half the stoichiometric amount of oxygen necessary to convert all the sulphide sulphur to sulphur dioxide, leaving a product having a composition within the above defined general formula. This product has the characteristics of pyrrhotite insofar as the sulphur content is concerned and as such is a pyrrhotitic material within the terms of this disclosure and is ideally adapted for treatment by the present method. Other ores or concentrates which contain minerals such as, but not limited to chalcocite, enargite, tetrahedrite, tennantite, arsenopyrite, pendlandite, cobaltite, marcasite, bornite, famatinite, stannite, millerite, chalcopyrite, pyrite and sphalerite can be treated according to the process of this invention or, if necessary, first treated in a manner similar to that described above with respect to pyrite.

A primary object of this invention is to separate non-ferrous metal values contained in pyrrhotitic ores and/or middling products derived from a concentration process by which such values are either dissolved in a leach solution or are prepared in a form in which they are amenable to concentration by a flotation process, with attendant production of elemental sulphur of a high degree of purity. Non-ferrous metal sulphides associated with pyrrhotitic ores and/or middling products may include, but are not limited to, values of one or more of the metals copper, lead, zinc, gold, silver, members of the platinum group, cobalt, nickel and cadmium.

The method is ideally adapted for the treatment of an ore which normally is not readily amenable to the concentration of desired metal values by a conventional flotation process. That is, the ore may be such that mineral particles are not exposed for attachment to the air bubbles in the flotation reaction, or the desired minerals may be so finely disseminated throughout the ore that very fine grinding is necessary to release them with the result that the minerals form a slime rather than a pulp mixture amenable to flotation. Alternatively, the pyrrhotitic material may be a low grade middling product derived from a previous selective flotation process and which contains minerals to the extent that a serious metal loss would result if discarded and yet which involves high capital and operating costs to extract and recover the metal values.

Regardless of the source of the pyrrhotitic material, we have found that it can be treated by the method of the present invention to produce a product which is readily amenable to concentration by a conventional flotation concentration process.

The method of producing elemental sulphur and of recovering non-ferrous metal values from pyrrhotitic mineral sulphides which contain non-ferrous metal values comprises the steps of dispersing finely divided pyrrhotitic mineral sulphide particles which contain non-ferrous metal values in an aqueous medium selected from the group consisting of water and aqueous sulphuric acid solution to form a slurry, reacting the slurry in a reaction zone at a temperature within the range of from about 200° F. to the melting temperature of sulphur and under a partial pressure of oxygen above 5 pounds per square inch, feeding a free oxygen bearing, oxidizing gas into the reaction zone, actively agitating the slurry and continuing the reaction to oxidize sulphide sulphur in the pyrrhotitic material to elemental sulphur, increasing the temperature to a temperature above the melting temperature of sulphur whereby elemental sulphur is agglomerated into liquid sulphur globules and non-ferrous metal values are simultaneously attached to liquid sulphur globules, cooling the slurry to a temperature below the melting temperature of sulphur and thereby solidifying the liquid sulphur globules to form solid sulphur pellets with cohering non-ferrous metal values, separating sulphur pellets from the slurry, and separating and recovering non-ferrous metal values from the sulphur pellets.

Pyrrhotitic mineral sulphide material to be treated by the present method is preferably finely pulverized to expose maximum surface area to the aqueous solution and to permit of a relatively uniform dispersion of particles in the solution during treatment. The size of the particles may vary widely, depending on the source or origin of the material and the manner in which the non-ferrous minerals are disseminated therein. It is found that the rate of oxidation of sulphide sulphur to elemental sulphur is best when the particle size is of the order of from about 35 to 325 mesh standard Tyler screen. Mineral sulphides such as a middling product from a previous flotation process may be of the order of about 80% minus 200 mesh and can be passed directly into the method of this invention. Material which has not otherwise been reduced in size should be pulverized to about 35 mesh or finer.

Pulverized pyrrhotitic material is mixed with the aqueous solution in a pressure vessel such as an autoclave. The solution is essentially water which may contain sulphate ions produced by side reactions during the course of operation. If the method is conducted as a batch operation, water or, in certain instances, dilute sulphur acid, can be employed at the start. Alternatively, water and mineral sulphides can be charged continuously into the reaction vessel and solid residue which is comprised of elemental sulphur, non-ferrous mineral sulphides occluded in or attached to elemental sulphur pellets and iron oxide, and aqueous solution, which usually contains dissolved non-ferrous metal values, can be withdrawn continuously from the reaction vessel.

The oxidation of sulphide sulphur contained in the pyrrhotitic material usually provides the heat necessary for the reaction. If this heat is not sufficient, supplemental heat can be provided by any suitable means. If the autogenous heat of the reaction tends to raise the temperature beyond the desired limits, the temperature can be controlled by conventional means, such as cooling coils.

Under the conditions described in detail hereinafter, pyrrhotitic material is first attacked by the oxidation treatment and elemental sulphur is formed. A portion of the non-ferrous mineral sulphides may be attacked under the strongly oxidizing conditions and enter the solution as soluble metal sulphates. However, at a temperature above the melting temperature of sulphur, the elemental sulphur tends to "wet" or enclose non-ferrous mineral sulphide particles as in a film and thus protect them from further attack under the oxidizing conditions. The resulting slurry is in condition for treatment by a conventional flotation process for concentration of the non-ferrous mineral sulphides and elemental sulphur either with or without prior separation of the solution from the solids.

The production of elemental sulphur and the attachment of non-ferrous mineral sulphide particles to elemental sulphur particles are affected by such factors as pulp density, that is the ratio of solids to solution, the time of retention, temperature and partial pressure of oxygen.

The ratio of solids to solution in the reaction zone influences the rate of oxidation of sulphide sulphur to elemental sulphur. The velocity of the reaction is reduced as the pulp density is increased, the maximum density being that at which the solids can be maintained as a relatively uniform dispersion in the aqueous solution. The minimum density is governed by operating economics to obtain a maximum yield of sulphur within a reasonable time. Pulp mixtures of the order of from about 35% to about 46% solids are very satisfactory having regard to the overall economics of the method.

Theoretically, the oxidation reaction could be conducted at temperatures as low as about 100° F. and as high as the boiling temperature of sulphur. In practice, however, it is found that good results are obtained at a temperature within the broad range of from about 200° F. to about 350° F. while the best results, having regard to the yield of elemental sulphur, appears to be obtained within the range of from about 220° F. to about 290° F.

The oxidation of sulphide sulphur of the pyrrhotitic material to elemental sulphur proceeds more rapidly than the oxidation of the sulphide sulphur of the non-ferrous mineral sulphides. Thus, the time of retention and the oxygen partial pressure are determined with a view to obtaining the maximum oxidation of sulphide sulphur in the pyrrhotitic material to elemental sulphur and separation of non-ferrous mineral sulphides from the pyrrhotitic material.

The temperature at which the operation is conducted, the time of retention and the partial pressure of oxygen are controlled to obtain maximum oxidation of sulphide sulphur of the pyrrhotitic material to elemental sulphur, having regard to the form in which it is desired to recover the non-ferrous metal values. That is, the method can be conducted to obtain maximum or minimum dissolution of non-ferrous metal values in the solution.

If it is desired to recover the major portion of the non-ferrous mineral sulphides wetted by or enclosed in globules of elemental sulphur with minimum dissolution of non-ferrous metal values in the aqueous solution, the time of retention is controlled to obtain maximum oxidation of the pyrrhotitic material and minimum oxidation of non-ferrous mineral sulphides. For example, at a temperature of about 250° F. and at a partial pressure of oxygen of the order of about 100 pounds per square inch above the pressure generated autogenously by the heat of the reaction, very satisfactory results are obtained with a time of retention of from about ten to about thirty minutes. At about the same temperature and at a partial pressure of oxygen of from about 25 pounds per square inch, a reaction time of from about 2 to about 5 hours is required. At a partial pressure of oxygen of about 5 pounds per square inch, a reaction time of the order of about 5 hours is required. In general, it is found that the method can be operated satisfactorily under an oxygen partial pressure of from about 5 to about 300 pounds per square inch with a time of retention varying inversely from about 10 minutes at the maximum pressure to about five hours at the minimum pressure.

It is found, also, that the treatment can be conducted with advantage at a temperature either below or about the melting temperature of sulphur, from about 230° F. to about 250° F. If the treatment is conducted at a temperature below the melting temperature of sulphur, it is desirable to heat the slurry at the end of the oxidation period to a temperature above the melting temperature of sulphur with active agitation, thus to melt the sulphur and agglomerate the particles into globules after which the temperature is reduced to solidify the sulphur globules. Alternatively, the method can be conducted at a temperature above the melting temperature of sulphur during which the elemental sulphur is agglomerated into globules as it is formed and at the end of the oxidation period the temperature is reduced to solidify the sulphur globules into pellets. Oxidation at a temperature above the melting temperature of sulphur, for example, from about 250° F. to about 290° F. favours the occlusion of non-ferrous mineral sulphides in the sulphur pellets. The rate of agitation should be reduced or stopped during cooling of the slurry to avoid breaking the sulphur pellets.

Elemental sulphur, the major portion of the iron values and sulphur-wetted mineral sulphides report in the solid residue. Some non-ferrous metal values and some of the iron may be extracted from the starting material and dissolved in the aqueous solution. The solids can be separated from the solution, such as by filtration. Elemental sulphur globules of greater than predetermined size can, if desired, be separated from the solid residue, such as by screening, leaving a residue comprised mainly of iron oxide with lesser amounts of non-ferrous mineral sulphides included in the undersize elemental sulphur particles. This residue is in ideal condition for concentrating the non-ferrous mineral sulphides in a small fraction of the original material.

A suitable method of collecting the sulphur and occluded non-ferrous mineral sulphides is a conventional oil-type flotation in acid circuit, from about pH 2 to pH 3.5, using about 2.5 to 4 pounds of stove oil, kerosene, or fuel oil, with about 0.2 to 0.3 pounds of frother per ton of solids, dry weight. A further suitable flotation process is a conventional "sulphide" flotation process at about atmospheric temperature using a sulphide collector, such as a xanthate, at about pH 7 to about pH 8.5, lime or soda ash being employed to neutralize the pulp, with a small amount of frother.

As the pulp recovered from the oxidation treatment may have a pH value of the order of about pH 2, the oil-type flotation process is preferred in that it is not necessary to neutralize the pulp mixture prior to flotation.

The non-ferrous mineral sulphides recovered from the flotation process can be slurried with lime water, about 25% solids in lime water containing about 3 grams per litre calcium oxide, and the mixture heated to a temperature above the melting temperature of sulphur to melt and agglomerate the elemental sulphur particles. Any large elemental sulphur globules recovered by screening the product from the oxidation step can be mixed and treated with the flotation concentrate in this step.

EXAMPLES (1) A pyrrhotitic middling material derived from the selective flotation of a nickel-copper bulk concentrate contained, after grinding and washing:

| | Percent |
|---|---|
| Iron | 46.3 |
| Sulphur (total) | 30.5 |
| Sulphur (sulphate) | 1.0 |
| Nickel | 0.81 |
| Sulphur (elemental) | 9.6 |

This material was slurried with water, about 41% solids, and heated to a temperature of about 230° F. for a period of time varying from 0.5 to 2 hours with an oxygen partial pressure of about 100 pounds per square inch. The temperature of the slurry was then raised to about 300° F. in the absence of oxygen for a period of about 15 minutes to agglomerate the sulphur into globules then cooled to below the melting temperature of sulphur to solidify the liquid sulphur globules into pebbles or pellets. The following results were obtained:

| Time | Percent S Recovered as Elemental S Pebbles | Residue, percent | Percent Ni Recovered in Solution |
|---|---|---|---|
| 0.5 hrs | 60.4 | 6.7 | 36.2 |
| 1.0 hrs | 72.6 | 7.0 | 63.0 |
| 2 hrs | 81.4 | 4.4 | 84.0 |

(2) A pyrrhotitic material similar to Example 1 above was slurried with water, pulp density about 46% solids, and reacted for two hours with an oxygen partial pressure of about 100 pounds per square inch with the following results:

| Temp. | Percent S as Elemental Sulphur | | Ni in Solution, percent |
|---|---|---|---|
| | Pebbles+ 48 Mesh | Residue | |
| 230° F | 72.8 | 10.1 | 69.5 |
| 230° F | 73.3 | 8.7 | 78.3 |
| 230° F | 40.7 | 8.2 | 21.8 |

(3) Similar results are obtained in conducting the oxidation at a temperature slightly above the melting temperature of sulphur. The material treated was a low grade middling product obtained from a selective flotation process in which a high grade nickel sulphide concentrate was separated from a bulk concentrate which contained both copper and nickel values. The middling product contained about 43.7% iron; about 1.73% nickel and about 28.5% sulphur. This material was ground for about one-half hour in a rod mill, slurried with water, about 41% solids, and reacted at a temperature of about 250° F. under a partial pressure of oxygen of about 25 pounds per square inch.

Table I.—Recovery of elemental sulphur

| Time | S as Elemental Sulphur, percent | Percent S as Sulphate Sulphur | Percent of Elemental Rougher Concentrate | S Recovered Cleaner Concentrate |
|---|---|---|---|---|
| 1 hr | 40.9 | 5.5 | 94.0 | 89.5 |
| 3 hrs | 71.1 | 13.8 | 95.8 | 95.1 |
| 5 hrs | 74.4 | 16.3 | 95.4 | 94.0 |
| 7 hrs | 70.0 | 15.1 | 95.8 | (¹) |
| 11 hrs | 70.8 | 18.7 | 94.9 | 94.5 |

¹ No cleaning.

Table II.—Nickel

| Time | Ni in Solution, percent | Ni Recovered as Sulphide Cleaner Concentrate, percent | Ni as Sulphides in Rougher Tails, percent |
|---|---|---|---|
| 1 hr | 8.8 | 69.6 | 21.6 |
| 3 hrs | 33.8 | 59.6 | 6.6 |
| 5 hrs | 43.1 | 46.2 | 10.6 |
| 7 hrs | 57.8 | 37.2 | 4.9 |
| 11 hrs | 68.5 | 25.9 | 5.8 |

The solids which contained the non-ferrous mineral sulphides were concentrated by flotation. The rougher flotation conditions were: pulp density 23% to 30%, pH 7.5 to 8.5 using sodium carbonate to neutralize the mixture; "301" xanthate collector reagent and "No. 5" pine oil frother. The cleaner flotation was conducted at a pulp density of from about 7% to about 10% solids with pH and reagents as in the rougher flotation.

*Table III.—Grade of sulphur-sulphide concentrate after flotation and prior to separation of elemental sulphur*

| Time | Fe, percent | Ni, percent | S (Elemental), percent |
| --- | --- | --- | --- |
| 1 hr | 39.7 | 2.75 | 22.6 |
| 3 hrs | 13.0 | 3.20 | 66.4 |
| 5 hrs | 14.4 | 2.55 | 62.1 |
| 7 hrs | 7.2 | 2.68 | 70.4 |
| 11 hrs | 7.6 | 1.68 | 79.3 |

*Table IV.—Grade of rougher tailings*

| Time | Fe, percent | Ni, percent | S (Elemental), percent |
| --- | --- | --- | --- |
| 1 hr | 39.1 | 0.40 | 1.74 |
| 3 hrs | 47.7 | 0.16 | 1.44 |
| 5 hrs | 49.3 | 0.28 | 1.56 |
| 7 hrs | 49.3 | 0.16 | 1.69 |
| 11 hrs | 48.6 | 0.12 | 1.45 |

It will be noted that under the described conditions of operation maximum non-ferrous metal extraction and dissolution in the aqueous solution is obtained at from about 7 to about 11 hours' reaction time, whereas maximum recovery of such metal values as mineral sulphides in collectable form as such is obtained at from about 1 to about 3 hours, with the maximum total metal values and sulphur recovery being obtained in about 3 hours' reaction time. The solubilization of non-ferrous metal values can be reduced by conducting the method at higher temperatures, of the order of from about 280° F. to about 290° F. with lower oxygen partial pressure, but the yield of elemental sulphur would be reduced. The operating conditions are therefore determined with regard to the maximum extraction of non-ferrous mineral sulphides whether dissolved in the aqueous solution or as sulphides and occluded in elemental sulphur particles and to the yield of elemental sulphur.

Following the separation of elemental sulphur from the flotation concentrate, a final concentrate was obtained which contained from about 8% to about 10% nickel, thereby effecting about a 6 to 1 concentration of non-ferrous metal values contained in material which otherwise was not amenable to treatment by a conventional flotation process.

The conditions under which the method is conducted are, of course, a matter of operating economics, having regard to the facilities available for treating the products of the method. For example, if the plant in which the method is operated has facilities for recovering metals from solutions, the method can be operated to obtain maximum yield of elemental sulphur and maximum conversion of non-ferrous metal values to and their dissolution in the leach solution as metal sulphates. It will be noted in this respect that in operating the method under the conditions prescribed above, 8.8% of the nickel values contained in the starting material entered the solution within the first hour and this extraction and dissolution increased to about 68.5% of the nickel as the time of retention was extended to eleven hours, and the grade of the concentrate was reduced accordingly.

However, if the plant in which the method is operated lacks facilities for recovering dissolved non-ferrous metal values from solutions, the method can be operated to obtain a maximum wetting of non-ferrous mineral sulphides by elemental sulphur with a minimum conversion of non-ferrous metal values to and their dissolution as soluble sulphates in the leach solution. It is found that this objective can be obtained by conducting the method at reduced oxygen partial pressure of the order of from about 5 to about 30 pounds per square inch, by operating it at temperatures above the melting temperature of sulphur, for example, from about 250° F. to about 290° F., and by reducing the time of retention to from about 11 hours to about 3 hours. Under these conditions, it is found that about 25% of the nickel contained in the starting material is converted to and dissolved in the leach solution as a soluble sulphate and more than 65% of the nickel is collected as nickel sulphide by elemental sulphur and is readily amendable to concentration by a conventional flotation process such as described hereinabove.

As a further modification of the method, elemental sulphur can be added at the start of an operation to coat non-ferrous mineral sulphides and thus protect them against attack under the oxidizing conditions. A portion of the elemental sulphur produced in each operation can be returned and mixed with the feed to the reaction zone to supply the elemental sulphur for this modification of the method.

Non-ferrous metal sulphates dissolved in the aqueous solution can be recovered, such as by treating the solution at elevated temperature and pressure with a reducing gas such as carbon monoxide or hydrogen. Alternatively, if the plant in which the method is operated does not have facilities for recovering product metal from such a solution, non-ferrous metal values can be precipitated as sulphides, such as by one or other of the following methods, and added to the non-ferrous mineral sulphide concentrate for shipment to a metals recovery plant. For example, the aqueous solution can be neutralized, such as by calcium oxide, and then treated with a sulphide sulphur compound such as hydrogen sulphide or calcium sulphide to precipitate the non-ferrous metal values as sulphides.

Alternatively, non-ferrous metal values dissolved in the solution can be precipitated as sulphides by the addition of iron sulphide at elevated temperature, for example, from about 300° F. to about 400° F., according to the equation:

$$MeSO_4 + FeS \rightarrow MeS + FeSO_4$$

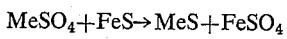

in which "Me" is a non-ferrous metal.

The aqueous solution from the low temperature acid oxidation treatment can be treated for the precipitation and recovery of dissolved non-ferrous metal values and thereafter discarded or it can be re-cycled to the oxidation stage for re-use. Alternatively, a portion of the solution from the oxidation stage can be withdrawn from the re-cycled solution and treated such as described above or by crystallization of metal sulphates. This latter modification has the advantage that the solution can be maintained very easily within a predetermined concentration of dissolved non-ferrous metal values and the method conducted on a continuous basis.

The method of the present invention possesses a number of important advantages. Primarily it is directed to the separation of non-ferrous mineral sulphides, including precious and noble metal values, with concurrent production of elemental sulphur. The oxidation is conducted under relatively low temperature and pressure conditions which permits the use of readily available, conventional equipment. The reaction proceeds rapidly and can be readily controlled to obtain either maximum dissolution of non-ferrous metal values in the aqueous solution or maximum occlusion of non-ferrous metal values in elemental sulphur particles with concurrent production of elemental sulphur. The method is ideally adapted for the treatment of pyrrhotitic material which contains non-ferrous metal values which normally are not readily amenable to conventional concentration processes to prepare them in a form in which they are readily amenable to such concentration processes.

What we claim as new and desire to protect by Letters Patent of the United States is:

1. The method of producing elemental sulphur and of recovering non-ferrous metal values from pyrrhotitic mineral sulphides which contain non-ferrous metal values which comprises the steps of dispersing finely divided pyrrhotitic mineral sulphide particles which contain non-ferrous metal values in an aqueous medium selected from the group consisting of water and aqueous sulphuric acid solution to form a slurry, reacting the slurry in a reaction zone at a temperature within the range of from about 200° F. to the melting temperature of sulphur and under a partial pressure of oxygen above 5 pounds per square inch, feeding a free oxygen bearing, oxidizing gas into the reaction zone, actively agitating the slurry and continuing the reaction to oxidize sulphide sulphur in the pyrrhotitic material to elemental sulphur, increasing the temperature to a temperature above the melting temperature of sulphur whereby elemental sulphur is agglomerated into liquid sulphur globules and non-ferrous metal values are simultaneously attached to liquid sulphur globules, cooling the slurry to a temperature below the melting temperature of sulphur and thereby solidifying the liquid sulphur globules to form solid sulphur pellets with cohering non-ferrous metal values, separating sulphur pellets from the slurry, and separating and recovering non-ferrous metal values from the sulphur pellets.

2. The method according to claim 1 in which aqueous sulphuric acid solution withdrawn from the reaction zone is re-cycled to the reaction zone.

3. The method according to claim 1 in which the pyrrhotitic mineral sulphides are of a particle size within the range of from about 35 to about 325 mesh standard Tyler screen.

4. The method according to claim 1 in which the slurry discharged from the oxidation reaction has a hydrogen ion concentration equivalent to that of about pH 2.

5. The method according to claim 1 in which non-ferrous metal values dissolved in aqueous sulphuric acid solution withdrawn from the reaction zone are precipitated therefrom and are separated and recovered from the solution.

6. The method according to claim 1 in which non-ferrous metal values dissolved in aqueous sulphuric acid solution withdrawn from the reaction zone are precipitated therefrom and are separated and recovered from the solution, and at least part of said withdrawn sulphuric acid solution is re-cycled to the reaction zone.

References Cited in the file of this patent

UNITED STATES PATENTS

| | | |
|---|---|---|
| 1,672,924 | Bacon | June 12, 1928 |
| 2,537,842 | McCauley et al. | Jan. 9, 1951 |
| 2,697,034 | Hadsel | Dec. 14, 1954 |

FOREIGN PATENTS

| | | |
|---|---|---|
| 181,984 | Great Britain | June 29, 1922 |
| 528,500 | Germany | June 29, 1931 |
| 361,207 | Canada | Oct. 20, 1936 |

OTHER REFERENCES

Morgan: "American Gas Practice," 1931, vol. 1, pp. 806–7.

Mellor: "Comprehensive Treatise on Inorganic and Theoretical Chemistry," vol. XIV, p. 137.